(12) United States Patent
Schaad et al.

(10) Patent No.: US 11,178,044 B2
(45) Date of Patent: Nov. 16, 2021

(54) COMMUNICATION SYSTEM

(71) Applicant: Kistler Holding AG, Winterthur (CH)

(72) Inventors: Marc Schaad, Unterentfelden (CH);
Marco Angliker, Zürich (CH); David Mueller, Hinwil (CH); Martin Roesch, St. Gallen (CH)

(73) Assignee: Kistler Holding AG, Winterthur (CH)

( * ) Notice: Subject to any disclaimer, the term of this patent is extended or adjusted under 35 U.S.C. 154(b) by 400 days.

(21) Appl. No.: 16/288,662

(22) Filed: Feb. 28, 2019

(65) Prior Publication Data
US 2019/0268258 A1 Aug. 29, 2019

(30) Foreign Application Priority Data
Feb. 28, 2018 (EP) ..................................... 18159230

(51) Int. Cl.
*H04L 12/733* (2013.01)
*H04L 29/06* (2006.01)
*H04L 29/08* (2006.01)

(52) U.S. Cl.
CPC .......... *H04L 45/126* (2013.01); *H04L 65/608* (2013.01); *H04L 67/06* (2013.01);
(Continued)

(58) Field of Classification Search
CPC ... H04L 45/126; H04L 67/322; H04L 65/608; H04L 67/06; H04L 69/22; H04L 67/12;
(Continued)

(56) References Cited

U.S. PATENT DOCUMENTS

| 6,105,434 A | 8/2000 | Engeler |
| 6,889,118 B2 | 5/2005 | Murray, IV et al. |

(Continued)

FOREIGN PATENT DOCUMENTS

| EP | 1681834 | 7/2006 |
| EP | 2911410 | 8/2015 |

(Continued)

OTHER PUBLICATIONS

Korea Office Action and Translation, dated Feb. 17, 2020, 11 pages.
(Continued)

*Primary Examiner* — Kibrom T Hailu
(74) *Attorney, Agent, or Firm* — Dority & Manning, P.A.

(57) ABSTRACT

A communication system includes data generation units that generate data and a plurality of data evaluation units physically separated from the data generation units and connected to the data generation units via a non-proprietary network. The data evaluation units evaluate data transmitted by the communication system, which includes a hardware abstraction layer that represents a data evaluation unit as a resource that includes a property "data transmission type." The property "data transmission type" is "Streaming" or "Bulk Upload" or "Streaming, Bulk Upload". The communication system reads the property "data transmission type" and accordingly transmits the generated data to the data evaluation unit in accordance with the read property "data transmission type".

14 Claims, 2 Drawing Sheets

(52) U.S. Cl.
    CPC ............ *H04L 67/322* (2013.01); *H04L 69/22* (2013.01); *H04L 67/12* (2013.01)

(58) Field of Classification Search
    CPC ..... H04L 43/00; H04L 69/329; H04L 69/328; H04L 69/321; H04L 69/26; H04L 67/10; H04L 67/141; H04L 69/08
    See application file for complete search history.

(56) References Cited

U.S. PATENT DOCUMENTS

| | | |
|---|---|---|
| 2006/0168269 A1 | 7/2006 | Sather |
| 2009/0072831 A1* | 3/2009 | Summerfield ......... G01V 3/083 324/323 |
| 2016/0098037 A1* | 4/2016 | Zornio ................. H04L 43/045 700/20 |
| 2017/0024586 A1 | 1/2017 | Aldrian |
| 2017/0171692 A1 | 6/2017 | Shinohara |
| 2018/0173661 A1* | 6/2018 | Rand .................... G06F 13/4282 |
| 2018/0337887 A1* | 11/2018 | Aluvala ............. H04L 63/0281 |

FOREIGN PATENT DOCUMENTS

| | | |
|---|---|---|
| EP | 2958398 | 12/2015 |
| JP | 2017107416 | 6/2017 |
| KR | 2006-0079108 | 7/2006 |

OTHER PUBLICATIONS

European Saarch Report and Written Opinion on Patentability, Application No. 18159230.4-1213, 15 pages.

* cited by examiner

COMMUNICATION SYSTEM

FIELD OF THE INVENTION

The invention relates to a communication system that transmits data generated by a data generation unit data to a physically remotely separated data evaluation unit that evaluates the data transmitted by the communication system.

BACKGROUND OF THE INVENTION

The Internet of Things refers to the communication, which includes data transmission, between any kind of physical object via a non-proprietary network such as the Internet.

For this purpose, US Patent Application Publication No. 2017-0024586, which is hereby incorporated herein by the reference for all purposes, describes data transmission between an industrial site and a communication entity physically separated therefrom. A data generation unit is present at the industrial site. A communication system comprises a hardware-related interface for data transmission from the data generation unit, and a web-enabled interface for data transmission to the communication entity. Data transmission between the hardware-related interface and the data generation unit takes place via a hardware-related protocol that uses only the five lowest layers according to the Open Systems Interconnection (OSI) model, namely the physical layer, data link layer, network layer, transport layer, and session layer. Data transmitted to the hardware-related interface by the data generation unit is stored in a data storage area by the communication system. Data transmission between the web-enabled interface and the communication unit occurs via a web-enabled protocol which uses all seven layers of the OSI model.

However, the physical objects in the Internet of Things are very diverse. Thus, data generation units function according to very different principles and transmit data via hardware-related interfaces that are different in design. It is important to have great flexibility with respect to a large number of different data generation units and different interfaces.

In this respect, U.S. Pat. No. 6,889,118, which is hereby incorporated herein by the reference for all purposes, discloses a robot comprising a robot software. The robot software has a three-layer architecture. A lowest layer is a robot hardware operating system above which is provided a hardware abstraction layer (HAL), and above this layer resides a robot control software. The HAL separates the robot hardware operating system from the robot control software, and only the HAL accesses the robot hardware operating system. The HAL transfers data between the robot hardware operating system and the robot control software. For this purpose, the HAL comprises software for communicating with the robot hardware operating system as well as software for communicating with the robot control software. This enables a flexible communication between a great number of different robot hardware and the robot control software without having to adapt the robot control software itself since it is sufficient to equip the HAL with the appropriate software for communicating with the operating system of different robot hardware.

It is furthermore desirable to achieve the communication in the Internet of Things in a way that is extremely robust against unforeseeable influences. Unforeseeable events such as network attacks, network failures, etc. may affect the communication. It is desirable that the communication can flexibly adapt to an availability of the network.

Moreover, it is generally desired to achieve the communication in the Internet of Things with high user friendliness. This means that a physically separated data evaluation unit which evaluates data transmitted from a communication system should function with a variety of different data generation units in a consistent manner. For this purpose, a display layer and an application layer of the data evaluation unit should follow the same measurement paradigms and have the same basic functions.

BRIEF OBJECTS AND SUMMARY OF THE INVENTION

It is an object of the present invention to provide a communication system that effects data transmission between a data generation unit and a data evaluation unit that is physically separated from the data generation unit, yet in a way that it is extremely robust against unforeseeable influences while remaining functional in a consistent manner with respect to the data evaluation unit.

This object has been solved as described below.

The invention relates to a communication system for data communication of data between a variety of data generation units and a variety of data evaluation units physically separated therefrom. The data generation units generate data, and the communication system transmits data generated by the data generation units via a non-proprietary network. The data evaluation units evaluate data transmitted by the communication system from the data generation units. An embodiment of the communication system comprises a hardware abstraction layer that represents a data evaluation unit as a resource. The resource has a "data transmission type" property, which is "Streaming" or "Bulk Upload" or "Streaming, Bulk Upload." The communication system is configured to read the "data transmission type" property and transmit the data generated to the data evaluation unit according to the "data transmission type" property that is read.

The communication system according to the invention comprises a hardware abstraction layer in which the data transmission type required according to a measurement paradigm of a data evaluation unit can be represented as a "data transmission type" property of a resource of this data evaluation unit. Preferably, the data transmission type required by this data evaluation unit is stored prior to data transfer by the communication system as a "data transmission type" property, said "data transmission type" property being "Streaming" or "Bulk Upload" or "Streaming, Bulk Upload". In the case of streaming, the transfer of data occurs in real time. While in the case of bulk upload, the transfer of data is not performed in real time. In this way, data transfer can be situationally adapted to the availability of the network. Moreover, in this way it is possible to adapt the transfer of data to the measurement paradigms of a presentation layer and an application layer of a data evaluation unit. If a data evaluation unit requires data transmission in real time, then this can be specifically defined in the "data transmission type" property. This inclusion in the "data transmission type" property ensures robustness against unforeseeable influences and consistent functionality of the data evaluation unit.

BRIEF DESCRIPTION OF THE DRAWINGS

In the following, the invention will be exemplarily illustrated with reference to the Figures in which.

DETAILED DESCRIPTION OF THE DRAWINGS

Figure 1:
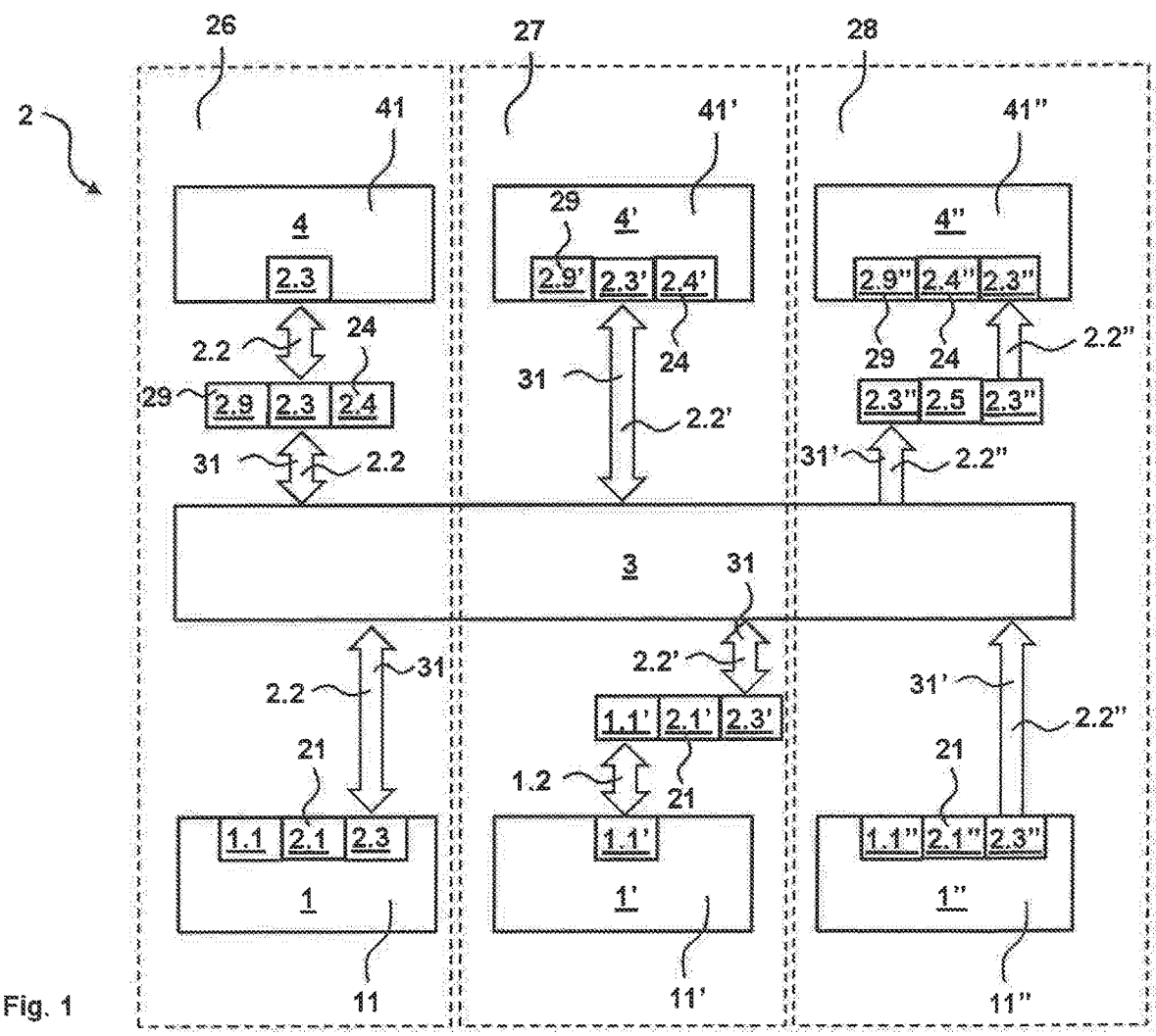
FIG. 1 shows a block diagram of components of the communication system.

FIG. 1 shows a block diagram of components of the communication system 2. The components consist of a plurality of different data generation units 1, 1', 1", at least one non-proprietary network 3 and a plurality of different data evaluation units 4, 4', 4". The components communicate with each other in an unidirectional or bidirectional manner. Unidirectional communication is represented by single arrows, while bidirectional communication is represented by double arrows. Communication as used in the present invention comprises both a status determination between the components and data transmission between the components.

The data generation units 1, 1', 1" comprise transducers that detect measured variables and generate data for detected measured variables. The measured variables may be physical measured variables such as a force, a pressure, an acceleration, a temperature, an angle, etc. The transducers generate data for measured variables in an active or passive manner. The data generation units 1, 1', 1" provide the generated data in an unprocessed or a processed form. Examples of processing would include conversion of voltage to current and vice versa, amplification of electric signals, conversion of analog signals to digital signals, and vice versa.

Thus, the embodiment in FIG. 1 includes a first data generation unit 1 in the form of a temperature transducer, which detects a temperature in the form of electric voltages and provides the electric voltages detected in the form of unprocessed data. An example of a first data generation unit 1 of this type is a NiCr—Ni thermocouple (type K).

The embodiment in FIG. 1 includes a second data generation unit 1' in the form of a piezoelectric pressure transducer, which detects a pressure in the form of electric charges. An electric charge amplifier electrically amplifies the electric charges detected and digitizes amplified electric charges generating digitized signals and provides the digitized signals in the form of processed data. An example of a second data generation unit 1' of this type is a type 6052C piezoelectric pressure transducer as described in the applicant's data sheet No. 6052C_000-552d-12.15 together with a type 5064C electric charge amplifier as described in the applicant's data sheet No. 2854A_000-409-06.14.

Furthermore, the embodiment in FIG. 1 includes a third data generation unit 1" in the form of a Hall effect transducer, which detects a crank angle by generating electric voltages. A comparator converts the detected analog electric voltages and generates digitized signals and provides the digitized signals in the form of processed data. An example of such a third data generation unit 1" is a type 2619A11 crank angle transducer together with a measuring and evaluation system for indexing of type 2893A internal combustion engines as described in the applicant's data sheet No. 2893_A000-724d-01.17.

The non-proprietary network 3 is a publicly accessible communication network such as the World Wide Web (WWW).

The data evaluation units 4, 4', 4" are situated physically separated from the data generation units 1, 1', 1". Physically separated as used in the present invention refers to a shortest distance of more than 30 meters.

The data evaluation units 4, 4', 4" evaluate transmitted data and represent transmitted and evaluated data to the user. For this purpose, each data evaluation unit 4, 4', 4" desirably includes a computing unit having a computing processor, a physical data storage device and an output device such as a display screen. The computing processor may be a central processing unit (CPU), and the like. The physical data storage device may be a FLASH memory, a hard disk (HD), a solid state disk (SSD), and the like.

The communication system 2 is arranged in a spatially decentralized manner. Other components of the communication system 2 include a plurality of hardware-related interfaces 1.1, 1.1', 1.1", a plurality of web-enabled interfaces 2.3, 2.3', 2.3", a plurality of client units 2.1, 2.1', 2.1", a plurality of cluster units 2.4, 2.4', 2.4", at least one data storage unit 2.5 and a plurality of programming interface units 2.9, 2.9', 2.9".

The communication system 2 has access to the hardware-related interfaces 1.1, 1.1', 1.1". The hardware-related interface 1.1, 1.1', 1.1" is a physical interface such as Bayonet Neill Concelman (BNC), D-Subminiature (D-Sub), Recommended Standard 232 (RS 232), and the like.

Each data generation unit 1, 1', 1" comprises a hardware-related interface 1.1, 1.1', 1.1". The hardware-related interface 1.1, 1.1', 1.1" is arranged in a housing of the data generation unit 1, 1', 1". A client unit 2.1, 2.1', 2.1" may comprise a hardware-related interface 1.1, 1.1', 1.1". In this case, a hardware-related interface 1.1, 1.1', 1.1" is arranged in a housing of the client unit 2.1, 2.1', 2.1". According to FIG. 1, a housing of a first data generation unit 1 comprises a first hardware-related interface 1.1. According to FIG. 1, a housing of a second client unit 2.1' comprises a second hardware-related interface 1.1'. According to FIG. 1, a housing of a third data generation unit 1" comprises a third hardware-related interface 1.1".

The communication system 2 has access to the web-enabled interfaces 2.3, 2.3', 2.3". A web-enabled interface 2.3, 2.3', 2.3" is a physical interface such as Registered Jack 45 (RJ 45), Institute of Electrical and Electronics Engineers 802.11 (IEEE 802.11), and the like.

Each data evaluation unit 4, 4', 4" comprises a web-enabled interface 2.3, 2.3', 2.3". The web-enabled interface 2.3, 2.3', 2.3" is arranged in a housing of the data evaluation unit 4, 4', 4". A data generation unit 1, 1', 1" or a client unit 2.1, 2.1' 2.1" or a cluster unit 2.4, 2.4', 2.4" or a data storage unit 2.5 may comprise a web-enabled interface 2.3, 2.3', 2.3". In this case, a web-enabled interface 2.3, 2.3', 2.3" is provided in a housing of a data generation unit 1, 1', 1" or in a housing of a client unit 2.1, 2.1', 2.1" or in a housing of a cluster unit 2.4, 2.4', 2.4" or in a housing of a data storage unit 2.5. According to FIG. 1, a housing of a first data generation unit 1 comprises a first web-enabled interface 2.3. According to FIG. 1, a housing of a second client unit 2.1' comprises a second web-enabled interface 2.3'. According to FIG. 1, a housing of a third data generation unit 1" comprises a third web-enabled interface 2.3". According to FIG. 1, a housing of a first cluster unit 2.4 comprises a first web-enabled interface 2.3. According to FIG. 1, a housing of a data storage unit 2.5 comprises a third web-enabled interface 2.3".

The data storage unit 2.5 is a physical data storage device such as a FLASH memory, a hard disk (HD), a solid state disk (SSD), and the like.

According to FIG. 1, the second hardware-related interface 1.1' of the second client unit 2.1' communicates with the second data generation unit 1' via a hardware-related communication channel 1.2. The second hardware-related communication channel 1.2' is a physical channel and may be implemented via a wired or optical medium but also via a transmission path.

The web-enabled interfaces 2.3, 2.3', 2.3" communicate with the non-proprietary network 3 via web-enabled communication channels 2.2, 2.2', 2.2". The web-enabled communication channels 2.2, 2.2', 2.2" are physical channels and may be implemented via wired or optical media but also via transmission paths.

The communication system 2 comprises a client-cluster structure such as Apache Active MQ, Apache Kafka, etc. At least one client unit 2.1, 2.1', 2.1" is positioned in close proximity to at least one data generation unit 1, 1', 1". In contrast, at least one cluster unit 2.4, 2.4', 2.4" is provided at any distance close to or spaced apart from at least one data evaluation unit 4, 4', 4". In close proximity as used in the present invention means located within the same subnetwork behind a router wherein addresses of data generation units 1, 1', 1" and client units 2.1, 2.1', 2.1" in the same subnetwork are not visible for third parties outside of this subnetwork.

Each client unit 2.1, 2.1', 2.1" and each cluster unit 2.4, 2.4', 2.4" comprise a computing unit including a computing processor and a physical data storage device. The computing processor may be a central processing unit (CPU), and the like. The physical data storage device may be a FLASH memory, a hard disk (HD), a solid state disk (SSD), and the like.

A data generation unit 1, 1', 1" may comprise a client unit 2.1, 2.1' 2.1". In this case, a client unit 2.1, 2.1', 2.1" is arranged in a housing of a data generation unit 1, 1', 1". A client unit 2.1, 2.1', 2.1" may also comprise its own housing. According to FIG. 1, a housing of a first data generation unit 1 comprises a first client unit 2.1. According to FIG. 1, a second client unit 2.1' comprises its own housing. According to FIG. 1, a housing of a third data generation unit 1" comprises a third client unit 2.1".

A data evaluation unit 4, 4', 4" may comprise a cluster unit 2.4, 2.4', 2.4". In this case, a cluster unit 2.4, 2.4', 2.4" is arranged in a housing of a data evaluation unit 4, 4', 4". However, a cluster unit 2.4, 2.4', 2.4" may also comprise its own housing. According to FIG. 1, a first cluster unit 2.4 comprises its own housing. According to FIG. 1, a housing of a second data evaluation unit 4' comprises a second cluster unit 2.4'. According to FIG. 1, a housing of a third data evaluation unit 4" comprises a third cluster unit 2.4".

A data evaluation unit 4, 4', 4" may comprise a programming interface unit 2.9, 2.9', 2.9". In this case, a programming interface unit 2.9, 2.9', 2.9" is arranged in a housing of a data evaluation unit 4, 4', 4". However, a programming interface unit 2.9, 2.9', 2.9" may also be arranged in the housing of a cluster unit 2.4, 2.4', 2.4". According to FIG. 1, a first cluster unit 2.4 comprises its own housing including a first programming interface unit 2.9. According to FIG. 1, a housing of a second data evaluation unit 4' comprises a second programming interface unit 2.9'. According to FIG. 1, a housing of a third data evaluation unit 4" comprises a third programming interface unit 2.9".

Figure 2:
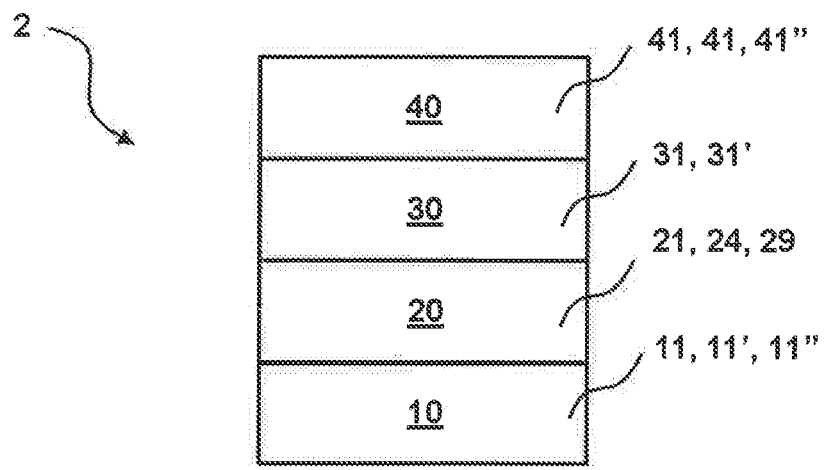
FIG. 2 shows a block diagram of a software architecture of the communication system according to FIG. 1.

FIG. 2 represents a block diagram showing the software architecture of the communication system 2. The software architecture comprises as a lowest layer a hardware layer 10, as a second lowest layer a hardware abstraction layer 20, as a second uppermost layer a communication layer 30, and as a top layer an application layer 40.

In the hardware layer 10, data is generated by means of a variety of different hardware drivers 11, 11', 11" of the data generation units 1, 1', 1". The hardware drivers 11, 11' 11" operate the data generation units 1, 1', 1".

The hardware abstraction layer 20 comprises at least one client protocol 21 and at least one cluster protocol 24 as well as at least one programming interface 29. The client protocol 21 is installed in the client units 2.1, 2.1', 2.1". The cluster protocol 24 is installed in the cluster units 2.4, 2.4', 2.4". The programming interface 29 is installed in the programming interface units 2.9, 2.9', 2.9".

The communication layer 30 comprises at least one web-enabled protocol 31, 31' enabling communication via the WWW. Web-enabled protocol 31, 31' is a network protocol that encompasses all seven layers of the OSI model such as the Transmission Control Protocols/Internet Protocols (TCP/IP) family, Hypertext Transfer Protocol (HTTP), JavaScript Object Notation (JSON), IoTivity, Constrained Application Protocol (CoAP), Universal Serial Bus (USB), and the like.

The client protocol 21 and the cluster protocol 24 communicate with each other via the web-enabled protocol 31, 31'.

The application layer 40 comprises a variety of application programs 41, 41', 41" of the data evaluation units 4, 4', 4". The application programs 41, 41', 41" may be stored in the physical data storage devices of the data evaluation units 4, 4', 4" and may be loaded from the physical data storage devices into the data processors of the data evaluation units 4, 4', 4". There are different application programs 41, 41', 41".

In the embodiment of FIG. 2, a first application program 41 in the form of an evaluation program evaluates data from piezoelectric sensors. For this purpose, data of measured variables such as force, pressure or acceleration are detected at a measuring facility and transmitted to the evaluation program by the communication system.

In the embodiment of FIG. 2, a second application program 41' in the form of a monitoring program monitors an injection molding process in an injection molding machine. In this case, data of measured variables such as temperature and pressure in a cavity of the injection molding machine are detected and transmitted to the monitoring program by the communication system 2.

In the embodiment of FIG. 2, a third application program 41" in the form of an indexing program evaluates data detected from a combustion of fuel and air in an internal combustion engine. In this case, data of measured variables such as temperature and pressure in a combustion chamber of the internal combustion engine as well as data of the measured variable crank angle of a crankshaft of the internal combustion engine are detected and transmitted to the indexing program by the communication system 2.

Figure 3:
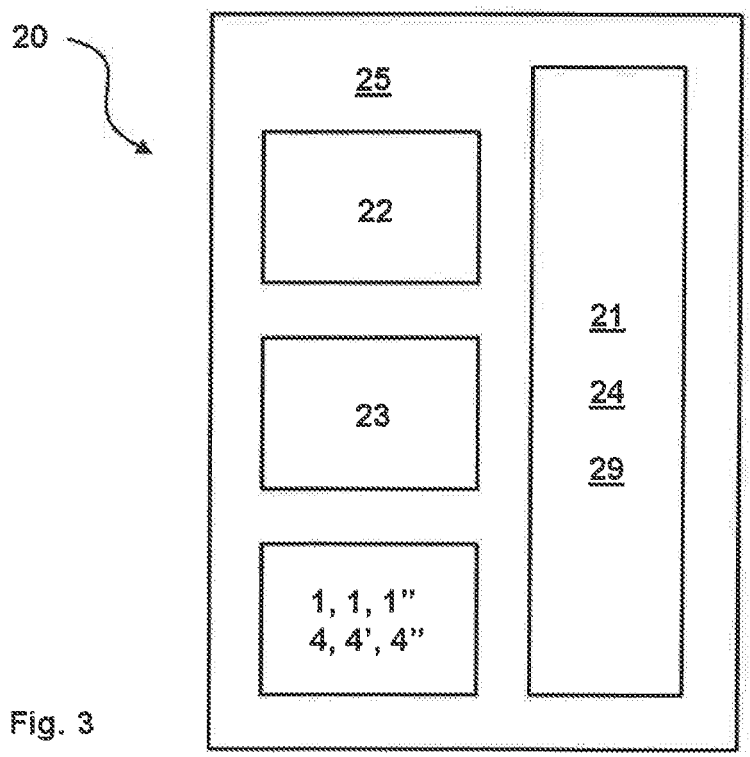
FIG. 3 shows a block diagram of a hardware abstraction layer of the software architecture according to FIG. 2.

FIG. 3 represents a block diagram showing the hardware abstraction layer 20 of the software architecture of the communication system 2. The hardware abstraction layer 20 provides for a uniform structure and behavior of the components of the communication system 2. Preferably, this is achieved according to the Representational State Transfer (REST) program paradigm. According to this paradigm, there is provided for uniform identification of the components, uniform determination of a status of the components, uniform cooperation of the components as well as uniform data security of the data transmission between the components.

In the hardware abstraction layer 20, the components cooperate via a semantic model (resource model). In the semantic, model each component is represented as a resource 25 (resource). Thus, in the semantic model the first data generation unit 1 is represented as resource 25 "temperature sensor". The second data generation unit 1' is represented as resource 25 "piezoelectric pressure transducer". The third data generation unit 1" is represented as resource 25 "Hall effect transducer". The first data evaluation unit 4 is represented as resource 25 "evaluation program" in the semantic model. The second data evaluation unit 4' is represented as resource 25 "monitoring program" in the semantic model. The third data evaluation unit 4" is represented as resource 25 "indexing program" in the semantic model. These representations apply to all components of the communication system 2. These representations are used uniformly by the communication system 2.

In the hardware abstraction layer 20, each resource 25 comprises an address 22 such as Uniform Resource Identifier (URI), Universally Unique Identifier (UUID), and the like. The address 22 unequivocally identifies a name of a resource 25.

In the hardware abstraction layer 20, the status of the resource is determined via status operations (CRUDN) such as create a resource (Create), retrieve the status of a resource (Retrieve), update the status of a resource (Update), delete a resource (Delete) and notify a resource (Notify).

In the semantic model, each resource has at least one property 23 (Property). The property 23 provides information about the component in a uniform manner. The property 23 is stored in the hardware abstraction layer 20 prior to data transmission by the communication system 2. The property 23 may be a "component name", i.e. a name of the component as provided by the manufacturer. The property 23 may be a "serial number", i.e. as assigned by the manufacturer of the component. The property 23 may be a "location name", i.e. the name of the location where the component is located. The property 23 may be a "protocol name", i.e. the protocol by which the component communicates. The property 23 may be a "function", i.e. the function that the component is able to perform. The property 23 may also be a "data description", i.e. the description of the data that can be generated or transmitted or evaluated. The property 23 may also be a "data format", i.e. the format in which the data can be generated or transmitted or evaluated. The property 23 may also be a "data transmission type", i.e. the transmission type by which the data can be transmitted. The property 23 may also be a "data transmission rate", i.e. the transmission rate by which the data can be transmitted.

The communication system 2 utilizes the semantic model. Thus, the client protocol 21 reads the address 22 of the resource 25 of a data generation unit 1, 1', 1" in order to biuniquely identify the data generation unit 1, 1', 1" with a name at the hardware-related interface 1.1, 1.1', 1.1". Furthermore, the cluster protocol 24 reads the address 22 of the resource 25 of a data evaluation unit 4, 4', 4" to biuniquely identify the data evaluation unit 4, 4', 4" with a name at the web-enabled interface 2.3, 2.3', 2.3". In addition, the client protocol 21 and the cluster protocol 24 use the properties 23 of the resources 25 to provide information about the data generation units 1, 1', 1" or about the data evaluation units 4, 4', 4" in a uniform manner.

Programming interface 29 uses a property 23 of a resource 25 to convert data generated by a data generation unit 1, 1', 1" into a parameterization of an application program 41, 41', 41" of a data evaluation unit 4, 4', 4". For this purpose, programming interface 29 reads a property 23 "data description" of the resource 25 of a data evaluation unit 4, 4', 4" in order to designate the data generated by a data generation unit 1, 1', 1" according to the measurement paradigm of the application program 41, 41', 41" of this data evaluation unit 4, 4', 4" by the read property 23 "data description". The programming interface 29 may also read a property 23 "data format" of the resource 25 of a data evaluation unit 4, 4', 4" to format the data generated by a data generation unit 1, 1', 1" according to the measurement paradigm of the application program 41, 41', 41" of this data evaluation unit 4, 4', 4" with the read property 23 "data format".

The communication between the components of the communication system 2 takes place in the communication layer 30. Preferably, as schematically shown in FIG. 1, the communication between the components occurs in the communication layer 30 either by means of messaging 26, streaming 27 or bulk upload 28. Messaging 26 and streaming 27 are performed by the client units 2.1, 2.1', 2.1" and the cluster units 2.4, 2.4', 2.4". Bulk upload 28 is performed by the data storage unit 2.5.

Messaging 26 is a synchronous or asynchronous communication in which a requesting component sends a request to the address of a requested component and waits for a response of the requested component to the address of the requesting component. As schematically shown in FIG. 1, messaging 26 is mediated by the client units 2.1, 2.1', 2.1" and the cluster units 2.4, 2.4', 2.4". Preferably, in messaging 26 the client units 2.1, 2.1', 2.1" and the cluster units 2.4, 2.4', 2.4" communicate with each other using TCP/IP as the web-enabled protocol 31. For messaging 26, each cluster unit 2.4, 2.4', 2.4" comprises a memory area in the physical data storage device in which memory area are cached requests together with the address 22 of the resource 25 of a requested component as well as responses together with the address 22 of the resource 25 of a requesting component. The cluster unit 2.4, 2.4', 2.4" is able to biuniquely identify cached queries and responses in the memory area. The cluster unit 2.4, 2.4', 2.4" communicates a request to the address 22 of the resource 25 of the requested component, and the cluster unit 2.4, 2.4', 2.4" communicates a response to the address 22 of the resource 25 of the requesting component.

As shown in FIG. 1, messaging 26 occurs between the first data generation unit 1 and the first data evaluation unit 4. Data transmission in messaging is bidirectional. For this purpose, the first cluster unit 2.4 and the first client unit 2.1 maintain a first communication channel 2.2 between the first data generation unit 1 and the first data evaluation unit 4.

A transmission rate in messaging 26 is very slow. Preferably, messaging 26 is used for a status determination, such as a status notification or a status update. For a status notification, for example, a data evaluation unit 4, 4', 4" enquires whether data is available for data transmission. For a status update, for example, a data generation unit 1, 1, 1" responds that data is available for data transmission and communicates the value of the resource 25 "data transmission type" of this data generation unit 1, 1, 1". Messaging 26 is not used for the transmission of data generated by the data generation unit 1, 1', 1" to a data evaluation unit 4, 4, 4", rather, messaging 26 is used to prepare, start and terminate a data transmission.

[€ 057]A data transmission is carried out by streaming 27 and/or by bulk upload 28. For the purposes of the invention, the conjunctions "and" and "or" designate the logical operators "AND" and "OR". Preferably, a property 23 regarding the "data transmission type" of a resource 25 determines whether data to be transmitted is transmitted by streaming 27 and/or by bulk upload 28. The property 23 then specifies "Streaming" or "Bulk Upload" or "Streaming, Bulk Upload" as the "data transmission type". For the purposes of the invention, "Streaming, Bulk Upload" means that the data transmission takes place by streaming 27 and by bulk upload 28 simultaneously. For example, data may be transmitted simultaneously in two degrees of resolution, i.e. on the one hand low-resolution data is transmitted by streaming 27 and on the other hand high-resolution data is transmitted by bulk upload 28. The information content of the low-resolution data is ten times lower than that of the high-resolution data, for example. Then, a data evaluation unit 4, 4', 4" may begin the evaluation of the transmitted data starting in real time with the low-resolution data and continuing later in time with the high-resolution data.

However, depending on the availability of the network 3, a data transmission with a property 23 "data transmission type" "Streaming, Bulk Upload" may also be carried out either by streaming 27 or by bulk upload 28. In this case, with high availability of the network 3, then data transmission will occur by streaming 27, Whereas with low availability of the network 3, then data transmission will occur by bulk upload 28. A decision whether the network 3 has a high availability or a low availability is performed situationally by the respective cluster unit 2.4, 2.4', 2.4" and the respective client unit 2.1, 2.1', 2.1" of the communication system 2.

A data evaluation unit 4, 4', 4" requests by means of messaging 26 via the cluster unit 2.4, 2.4', 2.4" at a client unit 2.1, 2.1', 2.1" of at least one data generation unit 1, 1', 1" as to whether data are available for data transmission to the requesting data evaluation unit 4, 4', 4". Then, the requested client unit 2.1, 2.1', 2.1" of the at least one data generation unit 1, 1', 1" replies that such data for data transmission is available and that the property 23 "data transmission type" of the resource 25 data generation unit 1, 1', 1" corresponds to "Streaming" or "Bulk Upload" or "Streaming, Bulk Upload". The cluster unit 2.4, 2.4', 2.4" transmits this response to the requesting data evaluation unit 4, 4', 4". Then, the requesting data evaluation unit 4, 4', 4" commands a client unit 2.1, 2.1', 2.1" of the at least one responding data generation unit 1, 1', 1" by messaging 26 via the cluster unit 2.4, 2.4', 2.4" to transmit the data according to the property 23 "data transmission type" to the requesting data evaluation unit 4, 4', 4". Typically, a cluster unit 2.4, 2.4', 2.4" transmits data between a large number of data evaluation units 4, 4', 4" and a large number of client units 2.1, 2.1', 2.1" of data generation units 1, 1', 1".

Streaming 27 refers to synchronous data transmission between two components of the communication system 2. The cluster units 2.4, 2.4', 2.4" and the client units 2.1, 2.1', 2.1" perform streaming 27. Preferably, for streaming 27 the cluster units 2.4, 2.4', 2.4" and the client units 2.1, 2.1', 2.1" communicate with each other via TCP/IP as the web-enabled protocol 31. Streaming 27 may also be asynchronous data transfer.

According to FIG. 1, streaming 27 occurs between a second data generation unit 1' and a second data evaluation unit 4'. During streaming 27, the second cluster unit 2.4' and the second client unit 2.1' maintain a second communication channel 2.2' between the second data evaluation unit 4' and the second data generation unit 1'. However, for streaming 27 each cluster unit 2.4, 2.4', 2.4" comprises a memory area (Topic) in the physical data storage device in which memory area data to be transmitted are cached together with the address 22 of the resource 25 of the second data evaluation unit 4'. The cluster unit 2.4, 2.4', 2.4" is able to biuniquely identify cached data in the memory space. The cluster unit 2.4, 2.4', 2.4" transmits data generated by the second data generation unit 1' which generated data are cached in the memory area to the address 22 of the resource 25 of the second data evaluation unit 4'.

By streaming 27, data are transmitted with very high transmission rates. Data transmission during streaming 27 occurs in real time. As used in the present invention, real time means that a period of time required for data transmission is so short that the transmitted data can be evaluated continuously in the data evaluation unit 4, 4', 4".

Bulk upload 28 refers to asynchronous data transfer between two components of the communication system 2. Bulk upload 28 is initiated and established by the cluster units 2.4, 2,4', 2.4" and the client units 2.1, 2.1', 2.1" by means of messaging 26. After bulk upload 28 has been initiated and established, it is performed by the data storage device 2.5. Preferably, for bulk upload 28, the cluster units 2.4, 2.4', 2.4" and the client units 2.1, 2.1', 2.1" communicate with each other using HTTP as the web-enabled protocol 31'. According to HTTP, a communication channel 2.2, 2.2', 2.2" is opened only for the time of a data transmission after which it is closed, i.e. in this case the communication channel 2.2, 2.2'. 2.2" is not maintained.

As shown in FIG. 1, bulk upload 28 occurs between a third data evaluation unit 4" and a third data generation unit 1". In bulk upload 28, a third communication channel 2.2" between the third data evaluation unit 4" and the third data generation unit 1" is not maintained. In bulk uploading, data is not transferred in real time. Data to be transmitted by bulk upload 28 is already collected and stored in the third data generation unit 1" and then bulk transmitted to the data storage unit 2.5. This data is then stored in the data storage unit 2.5 together with the address 22 of the resource 25 of the third data evaluation unit 4" to which the data is to be transmitted. Stored data are then transmitted from the data storage unit 2.5 to the address 22 of the resource 25 of the third data evaluation unit 4". Bulk upload 28 takes place upon a request of the third cluster unit 2.4" of the third data evaluation unit 4" whether the data storage unit 2.5 has stored data with the address 22 of the resource 25 of the third data evaluation unit 4" which data is then transferred as bulk upload 28 from the data transmission device 2 to the address 22 of the resource 25 of the third data evaluation unit 4".

The transmission types shown exemplarily in FIG. 1 may be combined with each other. Thus, the second cluster unit 2.4' and the third cluster unit 2.4" may also comprise a housing of their own like the first cluster unit 2.4.

LIST OF REFERENCE NUMERALS

1, 1, 1" data generation unit
1.1, 1.1', 1.1" hardware-related interface
2 communication system
2.1, 2.1', 2.1" client unit
2.2, 2.2', 2.2" communication channel
2.3, 2.3', 2.3" web-enabled interface
2.4, 2.4', 2.4" cluster unit
2.5 data storage unit
2.9, 2.9', 2.9" programming interface unit
3 non-proprietary network
4, 4', 4" data evaluation unit
10 hardware layer
11, 11', 11" hardware driver
20 hardware abstraction layer
21 client protocol
22 address
24 cluster protocol
25 resource
26 messaging 27 streaming
28 bulk upload
29 programming interface
30 communication layer
31, 31' web-enabled protocol
40 application layer
41, 41', 41" application program

The invention claimed is:

1. A communication system for data transmission via a non-proprietary network, the communication system comprising:
   a plurality of data generation units, each of the plurality of data generation units being configured to generate data, each of the plurality of data generation units being connected to the non-proprietary network;
   a client unit, wherein the client unit is arranged in close proximity to least one data generation unit;
   a plurality of data evaluation units, each of the plurality of data evaluation units being configured to evaluate data received from at least one of the plurality of data generation units, each of the plurality of data evaluation units being physically separated by at least 30 meters from each of the plurality of data generation units, each of the plurality of data evaluation units being connected to the non-proprietary network;
   at least one cluster unit, wherein the cluster unit is arranged in close proximity to at least one data evaluation unit;
   wherein each of the client unit and the cluster unit is configured to communicate with each other by messaging;
   wherein each of the plurality of data generation units being configured to include a hardware abstraction layer that is configured to represent at least one of the plurality of data evaluation units as a resource;
   wherein the resource comprises a property "data transmission type", wherein the property "data transmission type" is "Streaming" or "Bulk Upload" or "Streaming, Bulk Upload"; and
   wherein each of the plurality of data generation units being configured to read the property "data transmission type" and accordingly transmit the data generated to the at least one of the plurality of data evaluation units in accordance with the read property "data transmission type".

2. The communication system according to claim 1, wherein the hardware abstraction layer is configured to store the data transmission type required by a data evaluation unit as a property "data transmission type" prior to data transfer by the data generation unit.

3. The communication system according to claim 1, wherein each of the data generation units is configured so that if the read property "data transmission type" corresponds to "Streaming", then the data generation unit transmits the data generated to the data evaluation unit by streaming; if the read property "data transmission type" is "Bulk Upload", then the data generation unit transmits the generated data to the data evaluation unit by bulk upload; and if the read characteristic "data transmission type" is "Streaming, Bulk Upload", then the data generation unit transmits the generated data to the data evaluation unit simultaneously by streaming and bulk upload.

4. The communication system according to claim 1, wherein each of the data generation units is configured so that if the read property "data transmission type" is "Streaming, Bulk Upload" and if an availability of the nonproprietary network is high, then the data generation unit transmits the data generated to the data evaluation unit by streaming; wherein each of the data generation units is configured so that if the read property "data transmission type" is "Streaming, Bulk Upload" and if an availability of the network is low, then the data generation unit transmits the data generated to the data evaluation unit by bulk uploading.

5. The communication system according to claim 1, wherein the hardware abstraction layer represents each data generation unit as a resource; the hardware abstraction layer represents each data evaluation unit as a resource: each resource having an address that biuniquely designates a name of the resource; wherein the client unit includes a client protocol that reads the address of the resource of a data generation unit to biuniquely identify a data generation unit by a name; wherein the cluster unit includes a cluster protocol that reads the address of the resource of a data evaluation unit to biuniquely identify a data evaluation unit by a name.

6. The communication system according to claim 5, wherein messaging is synchronous communication including requests of a data generation unit or a data evaluation unit and responses of a data generation unit or a data evaluation unit; and wherein each of the client unit and the cluster unit is configured to maintain during messaging a communication channel between the requesting data generation unit or data generation unit and the requested data generation unit or data evaluation unit.

7. The communication system according to claim 6, wherein each cluster unit comprises a physical data storage device comprising a memory area; which is configured for caching each request together with the address of the resource of the requested data generation unit or data evaluation unit, and every response together with the address of the resource of the requesting data generation unit or data evaluation unit; wherein each cluster unit is configured for communicating a cached request to the address of the resource of the requested data generation unit or data evaluation unit; and wherein each cluster unit is configured for communicating a cached response to the address of the requesting data generation unit or data evaluation unit.

8. The communication system according to claim 5, wherein streaming is synchronous data transmission from a data generation unit to a data evaluation unit; and wherein each client unit and each client cluster unit is configured to maintain during streaming a communication channel between the data generation unit and the data evaluation unit.

9. The communication system according to claim 8, wherein each cluster unit comprises a physical data storage device comprising at least one memory area that is configured for caching data generated by the data generation unit together with the address of the resource of the data evaluation unit; and wherein each cluster unit is configured for transmitting cached data to the address of the resource of the data evaluation unit.

10. The communication system according to claim 5, wherein bulk upload is asynchronous data transmission from a data generation unit to a data evaluation unit; and wherein each client unit and each cluster unit is configured so that during bulk upload a communication channel between the data generation unit and the data evaluation unit is not maintained by the client unit and the cluster unit.

11. The communication system according to claim 10, wherein the communication system comprises at least one data storage unit comprising a physical data storage device that is configured for storing data generated by the data generation unit together with the address of the resource of the data evaluation unit; and wherein the cluster unit is configured for transmitting stored data to the address of the resource of the data evaluation unit.

12. The communication system according to claim 5, wherein the hardware abstraction layer comprises a programming interface that is configured to use a property of the resource of a data evaluation unit to convert data generated by a data generation unit into a parameterization of an application program of the resource of a data evaluation unit.

13. The communication system according to claim 12, wherein the resource has a property "data description"; wherein the programming interface is configured to read the property "data description" of the resource; and wherein the programming interface is configured to designate data generated by a data generation unit according to the read property "data description".

14. The communication system according to claim 12, wherein the resource has a property "data format"; wherein the programming interface is configured to read the property "data format" of the resource; and wherein the programming interface is configured to format data generated by a data generation unit according to the read property "data format".

* * * * *